United States Patent
Rechermann et al.

(10) Patent No.: US 6,686,694 B2
(45) Date of Patent: Feb. 3, 2004

(54) METHOD FOR MARKING QUARTZ GLASS LAMPS AND QUARTZ GLASS LAMPS PRODUCED USING THIS METHOD

(75) Inventors: Johann Rechermann, Biesenhard (DE); Xaver Brems, Biesenhard (DE); Georg Rosenbauer, Westheim (DE)

(73) Assignee: Patent Treuhand-Gesellschaft fuer elektrische Gluehlampen mbH, Munich (DE)

(*) Notice: Subject to any disclaimer, the term of this patent is extended or adjusted under 35 U.S.C. 154(b) by 104 days.

(21) Appl. No.: 09/845,330

(22) Filed: May 1, 2001

(65) Prior Publication Data
US 2001/0048274 A1 Dec. 6, 2001

(30) Foreign Application Priority Data
May 30, 2000 (DE) .......................... 100 26 567

(51) Int. Cl.⁷ ................................ H01J 17/04
(52) U.S. Cl. ................. 313/633; 313/623; 313/624; 313/625; 313/579; 313/332; 313/331; 313/318.07; 219/121.67; 219/121.68; 219/121.69; 219/121.85; 174/17.07; 174/17.08
(58) Field of Search ................ 313/623, 579, 313/318.07, 624, 625, 331, 332; 219/121.67, 121.68, 121.69, 121.85; 174/17.07, 17.08

(56) References Cited

U.S. PATENT DOCUMENTS

| | | | | |
|---|---|---|---|---|
| 5,158,709 A | * | 10/1992 | Setti | 252/301.4 R |
| 5,206,496 A | * | 4/1993 | Clement et al. | 219/121.6 |
| 5,214,350 A | * | 5/1993 | Remec et al. | 313/408 |
| 6,031,201 A | * | 2/2000 | Amako et al. | 219/121.68 |
| 6,160,568 A | * | 12/2000 | Brodsky et al. | 347/247 |
| 6,424,670 B1 | * | 7/2002 | Sukhman et al. | 372/107 |
| 6,433,302 B1 | * | 8/2002 | Miller et al. | 219/121.68 |
| 6,476,349 B1 | * | 11/2002 | Jendick | 219/121.68 |
| 6,501,046 B1 | * | 12/2002 | Miller et al. | 219/121.69 |

FOREIGN PATENT DOCUMENTS

JP  2495982 2  * 6/1982 ......... B23K/26/18

* cited by examiner

Primary Examiner—Vip Patel
Assistant Examiner—Holly Harper
(74) Attorney, Agent, or Firm—William E. Meyer

(57) ABSTRACT

The present invention relates to a method for marking quartz glass lamps having at least one fusible metal foil 10, 12, which is surrounded by quartz glass, for supplying electric voltage to luminous means 15 arranged in the interior chamber of a lamp vessel, in which method the fusible metal foil 10, 12 is marked through the quartz glass by means of a laser. The invention also relates to a quartz glass lamp having at least one fusible metal foil 10, 12 which is surrounded by quartz glass, for supplying electric voltage to luminous means 15 arranged in the interior chamber of a lamp vessel, in which lamp the fusible metal foil 10, 12 forms a marking area 16, the marking of the marking area 16 taking place through the quartz glass by means of a laser.

11 Claims, 1 Drawing Sheet

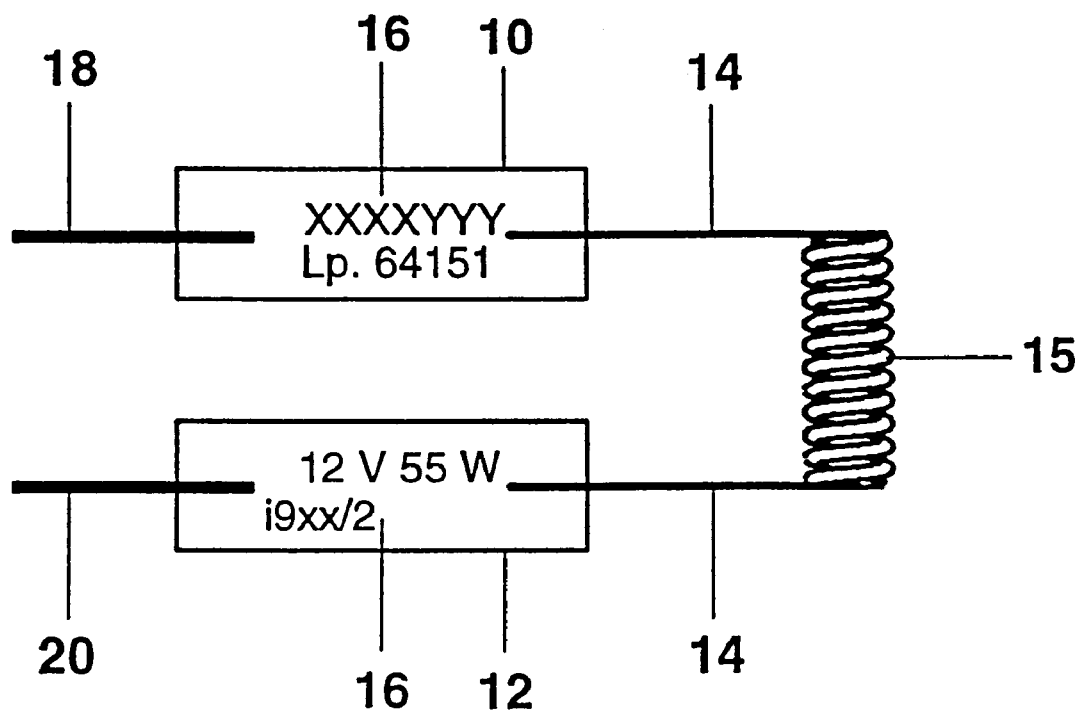

METHOD FOR MARKING QUARTZ GLASS LAMPS AND QUARTZ GLASS LAMPS PRODUCED USING THIS METHOD

TECHNICAL FIELD

The invention relates to a method for marking quartz glass lamps having at least one fusible metal foil which is surrounded by quartz glass, for supplying electric voltage to luminous means arranged in the interior chamber of a lamp vessel. The luminous means is either an incandescent filament of an incandescent lamp or an electrode for producing a discharge arc in a discharge lamp. In particular, it relates to a method for marking halogen lamps, i.e. either incandescent halogen lamps or discharge lamps with a halogen fill. Furthermore, the invention relates to a quartz glass lamp produced using the method.

PRIOR ART

Various types of methods are known for marking quartz glass lamps, in particular halogen lamps. In particular, lamps of this type are marked or stamped using what is known as the "pad printing" method.

However, this method leads to a number of technical problems. For example, the stamping using the "pad printing" method is a method which involves contact with the lamp, which may cause damage to the lamp. Furthermore, a dedicated stamping block has to be produced for each lamp identifier, leading to high costs. Therefore, date stamping of the quartz glass lamps which are to be marked is scarcely possible. In addition, changing the block involves standstill times. A further drawback is that the stamping blocks become worn, thus considerably increasing the risk of stamping errors. Furthermore, the known method has the drawback that the stamping ink has to be fired in using separate heating torches. Another drawback is that the stamp may become scratched over the course of time. Finally, a further drawback results from the fact that the pad printing stamp cannot be checked by means of an automated image-processing system, since the fusible metal foil arranged in the background of the marking causes contrast problems.

OUTLINE OF THE INVENTION

Therefore, it is an object of the present invention to provide a method according to the preamble of claim 1 which overcomes the described drawbacks of the conventional marking methods for quartz glass lamps.

It is a further object of the present invention to provide a quartz glass lamp produced in this way.

With a method or a quartz glass lamp having the features of the preamble of claim 1 or claim 8, respectively, these objects are achieved by the features of the characterizing part of claim 1 or claim 8, respectively.

Particularly advantageous embodiments are given in the dependent claims.

In a method according to the invention for marking quartz glass lamps, the fusible metal foil is marked through the quartz glass by means of a laser. This ensures that there is no damage to the quartz glass lamps which are to be marked, since it is a contactless marking method. In addition, the marking method according to the invention is significantly less expensive than the known methods, since there is no need for expensive stamping blocks which have the drawbacks referred to above. Furthermore, there is also no further need to fire in the stamping ink. Finally, the marking method according to the invention results in an optimum colour contrast, i.e. a clearly legible identification of the marking throughout the entire service life of the lamp. A further advantage of the method according to the invention is that the identification or marking cannot be removed. Furthermore, date stamping is now possible without problems. Furthermore, the marking method according to the invention enables the marking quality to be monitored by means of automated image-processing systems, since there are no contrast problems.

In a further advantageous embodiment of the method according to the invention, the fusible metal foil is a molybdenum foil. In particular, it is possible to use a doped molybdenum foil.

In a further advantageous embodiment of the method according to the invention, the laser is a Nd:YAG laser. In this case, a wavelength of 1064 nm is advantageously used for the laser marking. Moreover, it is advantageous if the laser is pulsed. This ensures that, firstly, a high-contrast, readily legible identification of the lamp is produced and, secondly, the service life of the lamp is not impaired by the marking operation.

In a further advantageous embodiment of the method according to the invention, in order to increase the marking rate the laser power is increased and/or the pulse frequency of the laser is reduced. In this way, it is possible to achieve very high throughputs when marking quartz glass lamps, which in turn significantly reduces the costs of marking a single quartz glass lamp.

In a further advantageous embodiment of the method according to the invention, to avoid glass cracks in the pinched area, the laser parameters (laser diameter, laser power, pulse frequency, etc.) are optimally adapted to the marking rate.

In a quartz glass lamp according to the invention, the fusible metal foil forms a marking area, the marking of the marking area taking place through the quartz glass by means of a laser. The advantageous result is a quartz glass lamp which on the one hand cannot be damaged by the marking operation and on the other hand can be produced at low cost, since the costs of the marking method are significantly reduced. Moreover, a permanent, high-contrast marking of the quartz glass lamp is ensured.

In an advantageous embodiment of the quartz glass lamp according to the invention, the fusible metal foil is a molybdenum foil. This foil may additionally advantageously be doped.

In an advantageous embodiment of the quartz glass lamp according to the invention, the glass surface of the pinched area is as smooth as possible, in order to ensure good legibility of the marking.

The invention also relates to the use of a Nd:YAG laser for marking quartz glass lamps having at least one fusible molybdenum foil which is surrounded by quartz glass, for supplying electric voltage to luminous means arranged in the interior chamber of a lamp vessel.

DESCRIPTION OF THE DRAWINGS

The invention is to be explained in more detail below with reference to an exemplary embodiment.

The FIGURE diagrammatically depicts two fusible metal foils 10, 12, in particular two molybdenum foils, which on one side are conductively connected to the ends 14 of the luminous incandescent filament 15, which is arranged inside a lamp vessel (not shown), of an incandescent halogen lamp and on the other side are conductively connected to in each case one contact pin 18, 20, in order to ensure the supply of electric voltage to the incandescent filament 15. Furthermore, it can be seen that the fusible metal foils 10, 12 each have a marking area 16. The marking of the marking areas 16 takes place through the quartz glass (not shown) which surrounds the fusible metal foils 10, 12, by means of a laser (not shown). The thickness of the fusible molybdenum foils is usually approximately 10 µm to 100 µm. The width and length of these molybdenum foils usually measure from a few millimeters to a few centimeters.

What is claimed is:

1. A method for visibly marking quartz glass lamps having at least one fusible metal foil (10, 12), which is surrounded by quartz glass, for supplying electric voltage to luminous means (15) arranged in the interior chamber of a lamp vessel, comprising the step of:

marking through the quartz glass to induce visible indicia on the fusible metal foil (10, 12) with a laser.

2. The method according to claim 1, wherein the fusible metal foil (10, 12) is a molybdenum foil.

3. The method according to claim 2, wherein the molybdenum foil is doped.

4. The method according to claim 1, wherein the laser is a Nd: YAG laser.

5. The method according to claim 4, wherein a wavelength of 1064 nm is used for the Nd:YAG laser marking.

6. The method according to claim 1, wherein the laser is pulsed.

7. The method according to claim 1, wherein, in order to increase the marking rate, the laser power is increased and the pulse frequency of the laser is reduced.

8. A quartz glass lamp having at least one fusible metal foil (10, 12) which is surrounded by quartz glass, for supplying electric voltage to luminous means (15) arranged in the interior chamber of a lamp vessel, wherein the fusible metal foil (10, 12) forms a marking area (16), the marking of the marking area (16) taking place through the quartz glass by means of a laser.

9. The quartz glass lamp according to claim 8, wherein the fusible metal foil (10, 12) is a molybdenum foil.

10. The quartz glass lamp according to claim 9, wherein the molybdenum foil is doped.

11. The quartz glass lamp according to claim 8, wherein the laser is a Nd:YAG laser.

\* \* \* \* \*